Figure 1:
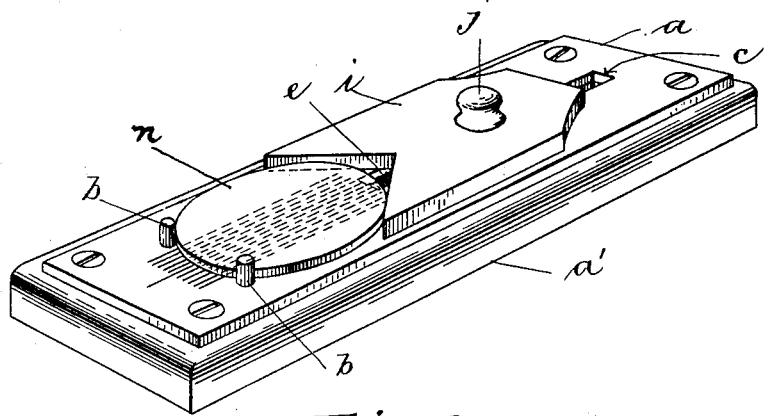

No. 803,794. PATENTED NOV. 7, 1905.
J. H. STARBUCK.
LENS CLAMPING DEVICE.
APPLICATION FILED SEPT. 3, 1904.

Witnesses:
Jh. J. Garfield
M. S. Crosier.

Inventor,
John H. Starbuck
by Chapin & Co.
Attorneys.

UNITED STATES PATENT OFFICE.

JOHN H. STARBUCK, OF PITTSFIELD, MASSACHUSETTS.

LENS-CLAMPING DEVICE.

No. 803,794.        Specification of Letters Patent.        Patented Nov. 7, 1905.

Application filed September 3, 1904. Serial No. 223,214.

*To all whom it may concern:*

Be it known that I, JOHN H. STARBUCK, a citizen of the United States of America, residing at Pittsfield, in the county of Berkshire and State of Massachusetts, have invented new and useful Improvements in Lens-Clamping Devices, of which the following is a specification.

This invention relates to a clamping device for the lenses of eyeglasses, the object thereof being to provide means to hold the lens of an eyeglass in such position that the exact position of a hole to be drilled therethrough to receive the nose-piece of the mountings may be determined according to a scale laid out on the clamping device, which may be read when the lens is in position thereon, said clamping device and scale being so organized as to indicate when a lens is in position thereon at what point above or below the longitudinal axis of the lens it is necessary to drill a hole to bring the focus of the lens when mounted into proper relation with the pupil of the eye.

The device is adapted to be used in conjunction with the apparatus used by opticians in fitting lenses to the eye.

It is well known that the position of the eye relative to a horizontal line varies greatly and it is necessary in adjusting eyeglasses to a person's face to adjust the lens as nearly as possible with its focus in proper place by bending the bow-spring; but the range of adjustment possible by this means is very limited, and, furthermore, accurate adjustment is frequently impossible.

The clamp forming the subject of this application embodies suitable means to hold the lens together with a device as a scale which may be readily seen through the glass, whereby the position of the hole which must be bored to locate the lens in proper position before the eye may be readily determined. This construction is clearly illustrated in the drawings, in which—

Figure 2:
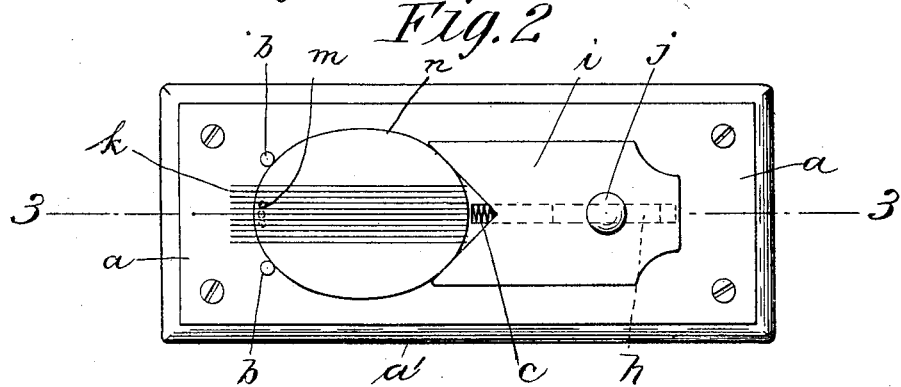
Figure 3:
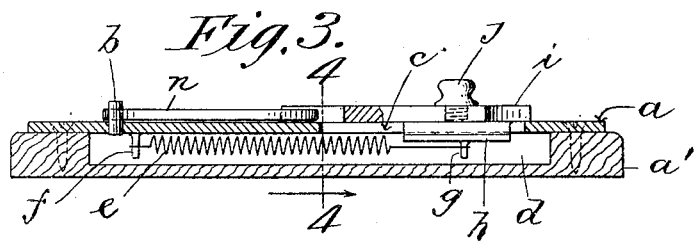
Figure 4:
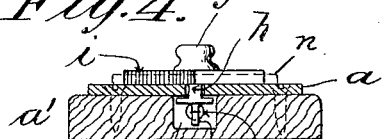

Figure 1 is a perspective view of the lens-clamping device. Fig. 2 is a plan view of the same, and Fig. 3 is a longitudinal section on line 3 3, Fig. 2. Fig. 4 is a transverse section on line 4 4, Fig. 3.

Referring now to the drawings, a suitable base-plate $a$ is mounted on a block $a'$ by screws in any suitable manner, and at an equal distance each side of the central longitudinal line of the plate are two posts $b$, which serve as abutments for one end of the lens. Near the other end of the base-plate $a$ the latter is provided with a centrally-located slot $c$, beneath which a groove $d$ is formed in the block $a'$. Located in this groove is a spiral spring $e$, one end of which is secured to a pin $f$ on the under side of the base-plate $a$ and the opposite end is secured to another pin $g$, secured in a block $h$, which has a sliding fit in the slot $c$, this block being secured to the plate $i$, the end of which contiguous to the posts $b$ is formed with a wide V-shaped notch therein. This plate $i$ is provided with a button $j$, whereby it may be moved lengthwise of the base-plate, guided by the engagement of the block $h$ with the slot $c$. This plate may be retracted far enough to permit the location between its forked end and the posts $b$ of the lens of an eyeglass, and when the slide is released the spring $e$ will move the plate toward the posts, thus holding the lens at four points—viz., the two posts, and the two points of contact in the forked end of the plate. This will hold the lens fixedly with its longitudinal axis located centrally of the base-plate $a$. On the surface of the latter and extending longitudinally through that part thereof occupied by the lens is a series of parallel equally-spaced lines $k$, which constitute a scale which serves to indicate where a hole $m$ should be drilled through the lens $n$ to cause the latter to be located in such position in its mountings that the focus of the lens will be brought into proper position relative to the pupil of the eye.

To ascertain how far above or how far below the longitudinal center of the lens the pupil of the eye is located, the optician is provided with a plain lens, which may be inserted in the ordinary testing-frame, on which lens lines similar to the lines $k$ are drawn, and by noting the position on this testing-lens of the pupil of the eye relative to the longitudinal center line of the lens it is possible to determine accurately how far above or below this center line a lens should be drilled to receive its mountings. This having been determined by comparison with the lines $k$ on the testing-lens, the lens which is to be used in the eyeglasses is then inserted in the clamp and the position of the hole marked thereon.

Having thus described my invention, what I claim, and desire to secure by Letters Patent of the United States, is—

1. A lens-clamping device of the character described comprising a base-plate, fixed and movable abutments to hold the lens on said plate, and a scale applied to that part of the plate beneath the lens comprising lines parallel with the line of movement of the movable abutment to indicate spaces laid off on either side of the longitudinal center line of the lens.

2. A lens-clamping device of the character described comprising a base-plate, two fixed abutments, and a sliding abutment in said plate, a spring to normally press the sliding abutment toward the fixed abutments to clamp a lens between them, and a scale applied to that part of the plate covered by the lens to indicate spaces laid off on either side of the longitudinal axis of the lens.

JOHN H. STARBUCK.

Witnesses:
    FRED T. FRANCIS,
    LIZZIE U. SMITH.